March 11, 1952     L. A. B. CABES     2,588,357
DEVICE FOR DETECTING ELECTRIC POTENTIALS
Filed July 31, 1947

Inventor
LUCIEN ALFRED BENOIT CABES

By

*R P Morris*
ATTORNEY

Patented Mar. 11, 1952

2,588,357

UNITED STATES PATENT OFFICE 2,588,357

DEVICE FOR DETECTING ELECTRIC POTENTIALS

Lucien Alfred Benoit Cabes, Antwerp, Belgium, assignor to International Standard Electric Corporation, New York, N. Y., a corporation of Delaware Application July 31, 1947, Serial No. 765,022
In the Netherlands May 26, 1943

Section 1, Public Law 690, August 8, 1946
Patent expires May 26, 1963

5 Claims. (Cl. 175—183)

The invention relates to novel means for detecting the existence of electric potentials of relatively small magnitude, particularly for use in telecommunication systems or other signalling systems.

It is the purpose of the invention to provide a circuit arrangement for controlling the functioning of a gaseous discharge tube and of a signal receiving device, which is connected in series with the discharge space thereof, by means of a predetermined electric potential.

According to the invention a potential, which should cause the tube to function, is used to permit a static switch to transmit an alternating current to the control electrode of the discharge tube and thereby cause the ionization thereof. Another feature of the invention is that the circuit, in which the controlling potential is acting, and the circuits of the different electrodes of the gaseous discharge tube are galvanically separated, so that the potentials applied to the discharge space of the tube may be chosen independent of the potentials prevailing in the first mentioned circuit.

According to one of the embodiments of the invention, a source of alternating current is connected to the primary winding of a first transformer of the static switch and the secondary winding of a second transformer of said switch is connected in the circuit of the control electrode of the discharge tube, the secondary winding of said first transformer and the primary winding of said second transformer being suitably so interconnected that, depending on the direction of a potential applied to non-linear resistances or rectifying elements, included in this interconnection, the alternating current may or may not be permitted to be transmitted to said second transformer, the arrangement being such that the controlling electric potential is used to reverse the direction of the potential applied to said rectifiers.

Figure 1:
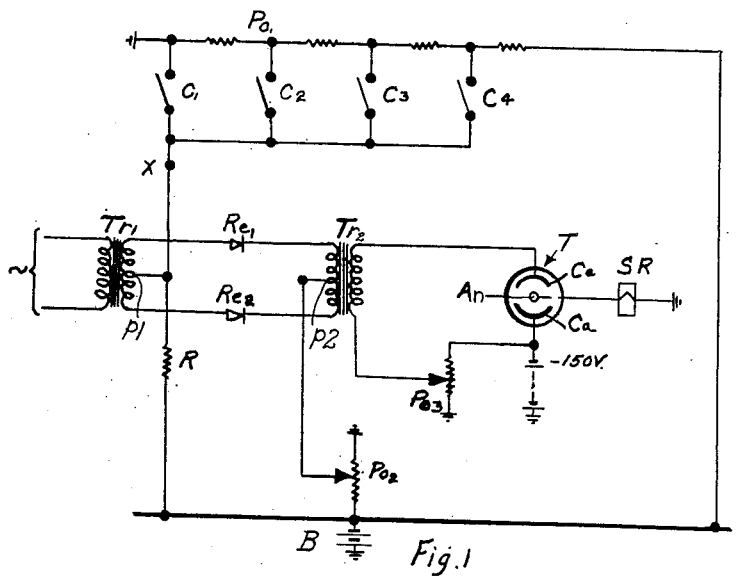
Figure 2:
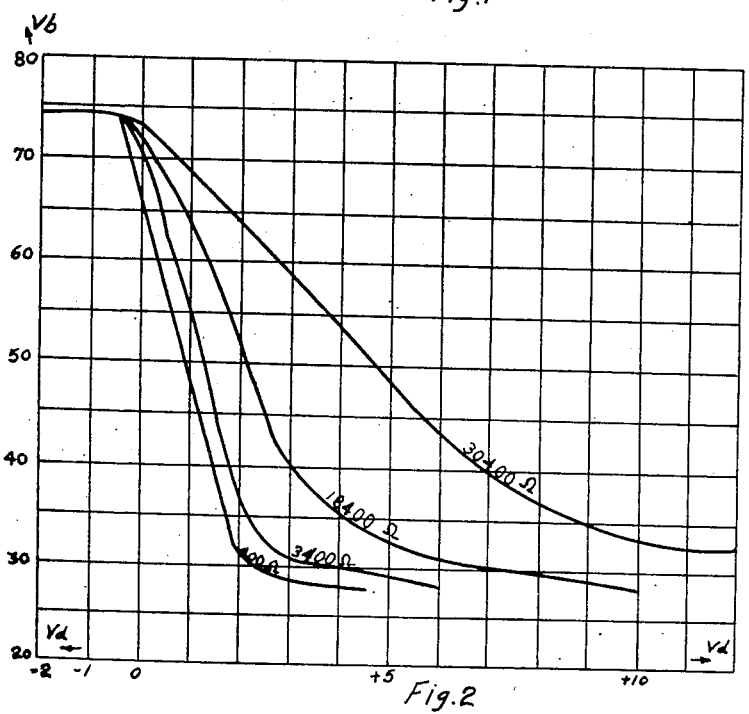

Other features will be apparent from the following description, which is illustrated by a circuit diagram, shown in Fig. 1, relating to a special embodiment of the invention, whereas Fig. 2 shows operating curves of this arrangement.

Referring to Fig. 1, the point "$x$" represents a point in an electrical circuit which is subject to variation of potential, e. g. in the manner shown, by the closure of one of a number of contacts $C_1$—$C_4$, which apply different potentials to this point, taken from a potentiometer $Po_1$, which is connected between the poles of a battery. Further, the transformers $Tr_1$ and $Tr_2$ together with the rectifying elements $Re_1$ and $Re_2$ constitute a static switch of known type, cf. Annals des Postes Telegraphes et Telephones, 1937, page 775.

The primary winding of transformer $Tr_1$ is connected to a source of alternating current, e. g. with a frequency of 450 cycles; the midpoint $p_1$ of the secondary winding of this transformer is connected to the point $x$ and also to the negative pole of the battery B through a resistance of very high value R. As a practical example, the potential of the A. C. source and the ratio of the windings $Tr_1$ may be so chosen, that the A. C. potential excited in the secondary winding of $Tr_1$ amounts to e. g. 2 volts.

The midpoint $p_2$ of the primary winding of transformer $Tr_2$ is connected to what is with respect to the ground a negative potential, obtained from the variable potentiometer $Po_2$, in such a manner that the potential at the point $p_2$ is normally (i. e. with contacts $C_1$—$C_4$ open) positive with respect to that prevailing at point $p_1$. The rectifiers $Re_1$ and $Re_2$ are so connected that they present a path of very high resistance to the D. C. potential under these conditions, and owing to the bias to which they are subjected in the manner described (the difference in D. C. potential between $p_1$ and $p_2$ being assumed to be more than the peak value of the A. C. potential in the secondary winding of $Tr_1$) no alternating current is able to pass through them and the primary winding of $Tr_2$.

Transformer $Tr_2$ is a step-up transformer with, in the practical example considered, a ratio of e. g. 1:20 between the primary and secondary windings, so that if an A. C. potential of 2 volts were applied to the primary windings, some 40 volt potential would be excited in the secondary winding. The latter is at one side connected to the control electrode $Ce$ of the gaseous discharge tube T and at the other side to the potentiometer $Po_3$, from which a biasing potential is connected through this winding to cathode $Ca$ in such a manner that the tube T will normally not ionize, because the biasing potential will be below the value required to provoke an ionization of the control gap between the control electrode $Ce$ and the cathode $Ca$ of this tube.

When $Re_1$ and $Re_2$ become conductive, an A. C. potential of sufficient potential will be excited in the secondary winding of $Tr_2$ to cause the tube to ionize during the first half cycle in which this potential and the biasing potential are aiding, thereby causing the operation of a signalling relay SR, or other suitable device, in series with the main gap of the tube in a circuit which may be traced from the negative pole of a 150 volt battery, via cathode $Ca$, main discharge gap, anode $An$ and through $SR$ to the ground.

The rectifier $Re_1$ and $Re_2$ may be rendered conductive by a reversal of the potential between the points $p_1$ and $p_2$, which may be caused by the closure of one of the contacts $C_1$—$C_4$, provided that these contacts are connected to a point of the potentiometer $Po_1$ which is positive with respect to the potential obtained from $Po_2$. In this connection it should be observed that the value of resistance R is so high, compared with the resistances through which potential is connected to point $x$ from any of the contacts $C_1$—$C_4$, that its presence has a negligible effect on the potential at point $p_1$.

It will be obvious that by varying the setting of $Po_2$ it is possible to modify the potential required at point $x$ to obtain the functioning of tube T and the signalling relay SR, without changing the potentials connected at any of the electrodes of tube T, so that this may work under unvarying conditions, no matter what predetermined potential is required at the point $x$, at which it is desired to cause the tube T to function and the relay SR to be actuated. It will thus be seen that the arrangement is in effect a potential comparing device since it compares a reference potential applied between the points $p_1$ and $p_2$, determined by the setting of potentiometer $Po_2$, and a potential applied at the point $x$, the arrangement being such that the potential applied at $x$ bucks or counteracts that applied from the potentiometer $Po_2$. When the potential applied at $x$ is of such polarity and magnitude as to reverse the potential applied from potentiometer $Po_2$, the so-called static switch becomes conductive and passes an alternating current from the A. C. source which does not vary for different magnitudes of the reference potential and the potential to be detected. The device comprising transformers $Tr_1$, $Tr_2$ and rectifiers $Re_1$ and $Re_2$ therefore acts as a switch for controlling the passage of A. C. and since it comprises no moving contacts or parts it is commonly known in the telecommunication art as a static switch.

It will be recognized that this is a very valuable feature of the arrangement described, because firstly it enables the battery potentials which are the most suitable or convenient for the operation of the discharge tube to be chosen entirely independently of the value of the potential which it is required to detect, and secondly, because it is thereby rendered possible to determine any potential to be detected at will by simple means, without affecting either the working potential of the main gap of the tube or the bias potential thereof. Neither of these two possibilities is afforded when letting the potential to be detected act directly on the control electrode of the tube as then all potentials used in connection with the tube are directly dependent on the value of the potential to be detected.

A further important feature is, that it is possible to detect relatively small differences in potential which it would be impossible to do when letting them act on the control electrode directly. In order to explain this, it should be stated that although theoretically the biasing potential of a gaseous discharge tube may be chosen quite near to the breakdown potential, viz. that required to ionize the control gap, so that only a small additional signalling potential would be required to cause the tube to function, in practice the biasing potential should remain considerably below the breakdown potential; e. g. a tube which has a normal breakdown potential of 70 volts cannot be given a higher bias than 55 volts in practice. This is due to the extremely speedy operation of these tubes, so that small potentials of very short duration, e. g. of the order of $10^{-4}$ to $10^{-6}$ sec. may already cause their ionization. Transient potentials of this duration may easily be picked up, even by short stretches of wiring, by induction, due to the opening or closure of neighboring circuits (cf. the article by A. M. Curtis in "Electrical Engineering," June 1940, vol. 59, No. 6, pages 360–368), and when choosing the bias potential of a discharge tube to be quite near to its breakdown potential, undue functioning may be caused frequently thereby.

With the arrangement here described, it is possible to obtain reliable operation of the discharge tube by relatively small differences of potential, even if the biasing potential is quite low. This is shown by the curves represented by Fig. 2 which have been plotted to show the relation between the different values of D. C. potential $Vd$ (the difference between the bucking voltages derived, respectively, from potentiometers $Po_1$ and $Po_2$), as applied in series with different amounts of resistance R between the points $p_1$ and $p_2$ of Fig. 1, which are required to produce the breakdown of the tube, and different values of the biasing potential $Vb$.

The four curves shown in Fig. 2 indicate the results obtained with a resistance of respectively 900, 3,400, 10,400 and 30,400 ohms connected in series with the source of potential $Vd$.

It will be seen that the tube used in this example had a breakdown potential of 74 volts, and that, so long as the potential $Vd$ exceeds 0.5 v. in the negative direction, i. e. in the direction of high resistance of rectifiers $Re_1$ and $Re_2$, it is required to apply the full potential $Vb$ of 74 v. to the control gap before breakdown happens.

Assuming the bias potential $Vb$ connected to the tube to be 55 volts, the curve shows that with resistances of 900, 3,400, 10,400 and 30,400 ohms respectively connected in the biasing circuit for the rectifiers $Re_1$ and $Re_2$, the potential $Vd$ should be 0.7 v., 1.0 v., 1.8 v. and 3.7 v. in the positive direction respectively, in order to produce the functioning of the tube.

The fact that the discharge of the tube starts already with a biasing potential slightly below the break-down value at small negative values of $Vd$, as well as the fact that the value of $Vd$ varies with the amount of resistance connected in series with it, may both be explained by considering that when the negative value of $Vd$ is reduced below the A. C. potential applied to the rectifiers, at least one of these will present a path of low resistance to each half of the waves of A. C. so that a rectifying action will result, with the rectified currents flowing through one-half of the secondary winding of $Tr_1$, one of the rectifiers, one-half of the primary winding of $Tr_2$ and hence through a return path constituted by a portion of $Po_2$ with its series resistance R, connected between the points $p_2$ and $p_1$.

As a consequence, a certain amount of A. C. potential will be energized in the secondary winding of $Tr_2$ as a result of this rectified current, of which the value depends to a certain extent on the amount of resistance connected in series with the potentiometer $Po_2$.

It will be seen that the arrangement disclosed may replace a sensitive polarized relay, wherever it is required to detect the existence of a potential of a relatively small value or of a predetermined polarity, also when such potentials are present in circuits having high internal resistances, as a small fraction of a milli-ampere of current passing through the static switch already suffices to produce a reliable operation of the detecting arrangement.

The circuit diagram shows the manner in which it is possible to detect the existence of potentials at the point $x$ which are positive with respect to the potential supplied from $P_{o2}$. It is equally well possible to detect negative potentials, by interchanging the connections to points $p_1$ and $p_2$ of the circuit, or alternatively, by reversing the connections of $Re_1$ and $Re_2$, so that they pass direct current in the opposite direction.

It will be understood that the tube T may be deenergized by any suitable means, not shown, as soon as the operation of the signalling relay SR has resulted in a desired operation or attracted the attention of a supervisor.

Instead of the embodiment of a static switch, as shown in the drawing, other known forms may be used, which serve the purpose of blocking an alternating current by means of a direct current potential, or which permit the transmission thereof by the presence of such a potential.

It is evidently also possible to detect the presence of alternating current potentials by means of the detecting arrangement as shown by the drawing and described above.

I claim:

1. A circuit arrangement for detecting electric potentials of predetermined polarity and minimum amplitude, comprising a gas discharge tube, signalling means operable by said tube, a source of alternating current of constant amplitude, a first transformer having its primary connected across said source, a second transformer having its secondary connected across the input of said tube, a first rectifier connecting a terminal of the secondary of said first transformer to a terminal of the primary of said second transformer, a second rectifier connecting the other terminal of the secondary of first transformer to the other terminal of the primary of said second transformer, said rectifiers being poled to oppose each other, a source of direct current connected intermediate the substantial midpoints of the last-mentioned primary and secondary so as to increase the impedance of said rectifiers, biasing means normally maintaining said tube non-conductive, and input means for applying the potentials to be detected to said rectifiers in bucking relationship to said source of direct current so that, upon attainment of said minimum amplitude, alternating currents passing said rectifiers will be sufficient to overcome the effect of said biasing means and ionize said tube.

2. A circuit arrangement according to claim 1 wherein said second transformer is a step-up transformer.

3. A circuit arrangement for detecting a direct current potential of predetermined polarity and magnitude comprising a gas discharge tube having a control electrode, a utility device connected in series with a discharge path of said tube, a source of alternating current coupled to said control electrode over a circuit comprising a pair of serially connected unilateral conducting devices, said devices being poled to oppose each other, a source of direct current potential, circuit means applying a direct current biasing potential between said unilateral conducting devices greater than the peak value of said alternating current and of such polarity that such circuit comprising said unilateral conducting devices is rendered non-conductive for said alternating current, and circuit means applying to the opposite terminals of said unilateral conducting devices another direct current potential to be detected of such value that said biasing potential is counteracted and said circuit is rendered conductive for said alternating current.

4. A circuit arrangement according to claim 3 in which said alternating current source is coupled by a first transformer to said circuit comprising said unilateral conducting devices, said last-mentioned circuit being coupled to the control electrode of said gas discharge tube over a second transformer.

5. A circuit arrangement according to claim 3 wherein said alternating current source is coupled to said circuit comprising the unilateral conducting devices over a first transformer, said last-mentioned circuit is coupled to said control electrode of said gas discharge tube over a second transformer, the respective ends of the secondary winding of said first transformer and the primary winding of said second transformer being connected together over said unilateral conducting devices and means being provided for applying said reference potential and said potential to be detected to the center points of said secondary and primary windings.

LUCIEN ALFRED BENOIT CABES.

REFERENCES CITED

The following references are of record in the file of this patent:

UNITED STATES PATENTS

| Number | Name | Date |
|---|---|---|
| 1,592,612 | Meyer | July 13, 1926 |
| 1,708,806 | Stone | Apr. 9, 1929 |
| 1,726,163 | Powell | Aug. 27, 1929 |
| 1,829,837 | Newby | Nov. 3, 1931 |
| 1,872,560 | Breisky | Aug. 16, 1932 |
| 1,967,306 | Hallen | July 24, 1934 |
| 2,069,934 | Arguimbau | Feb. 9, 1937 |
| 2,119,194 | Babler | May 31, 1938 |
| 2,305,845 | Cockerell | Dec. 22, 1942 |
| 2,367,509 | Knowlton | Jan. 16, 1945 |